United States Patent

Cuomo et al.

[11] Patent Number: 5,946,289
[45] Date of Patent: Aug. 31, 1999

[54] METHOD AND SYSTEM FOR A SHIPPING AND PLAYING ADAPTER TO ENABLE A REDUCED SIZE CD TO PLAY IN A FULL-SIZED CD PLAYER

[75] Inventors: Gennaro A. Cuomo, Apex; Richard J. Redpath, Cary, both of N.C.

[73] Assignee: International Business Machines Corp., Armonk, N.Y.

[21] Appl. No.: 08/855,546

[22] Filed: Jun. 4, 1997

[51] Int. Cl.⁶ .......................................................... G11B 3/70
[52] U.S. Cl. ............................................................. 369/289
[58] Field of Search ................................... 369/289, 274, 369/280, 281, 292

[56] References Cited

U.S. PATENT DOCUMENTS

| | | | |
|---|---|---|---|
| 3,201,133 | 8/1965 | Matsukata | 360/289 |
| 4,837,784 | 6/1989 | Yamamori | 369/289 |
| 4,899,330 | 2/1990 | Einhaus | 369/289 |
| 5,016,241 | 5/1991 | Lee et al. | 369/289 |
| 5,204,853 | 4/1993 | Kamoshita | 369/289 |
| 5,208,802 | 5/1993 | Suzuki et al. | 369/289 |

FOREIGN PATENT DOCUMENTS

| | | | |
|---|---|---|---|
| 1-213858 | 8/1989 | Japan | 369/289 |
| 2-37007 | 8/1990 | Japan | 369/289 |

*Primary Examiner*—David D. Davis
*Attorney, Agent, or Firm*—A. Bruce Clay

[57] ABSTRACT

A shipping and playing adapter enables a reduced size CD to play in a full-sized CD player. The adapter comprises first and second substantially semi-circular portions constructed of a material suitable for playing in a CD player. When combined together, the first and second portions form a disk dimensioned approximately equal to a full-sized CD for receiving the reduced size CD thereon. The first and second portions may either be permanently attached along a fold line or removably attached by matching male and female parts. When combined, the first and second portions may have an inner circular surface for receiving the reduced size CD. The circular surface may be coated with a permanent or temporary adhesive. Alternatively, the first and second portions may have a center cut-out for receiving the reduced size CD therein.

6 Claims, 3 Drawing Sheets

METHOD AND SYSTEM FOR A SHIPPING AND PLAYING ADAPTER TO ENABLE A REDUCED SIZE CD TO PLAY IN A FULL-SIZED CD PLAYER

FIELD OF THE INVENTION

This invention relates in general to compact disks, and in particular to a method and system for a shipping and playing adapter to enable a reduced size CD to play in a full-sized CD player.

BACKGROUND OF THE INVENTION

Compact digital disks (CD's) have proliferated in use for everything from audio to computer software to video. As with all electronic/computer equipment, CD's are getting smaller. Most CD players (for audio and computer software) are designed to accommodate a CD that is 4.75 inches in diameter. In a typical CD player, the CD is pushed into a slot or placed onto a tray that is sized (ie., slightly larger than 4.75 inches in diameter) to hold the CD from excessive lateral (but not rotational) movement. Therefore, unless the player is turned sideways or upside down, the player can safely play the 4.75 inch CD. When the player is placed into the "Play" mode, a spindle rises up into and grips the internal edges of the CD through a center hole therein to enable rotational movement of the CD and thus playing thereof.

If the CD is smaller than the standard 4.75 inch diameter, there is no support to keep the CD in a position for the spindle to raise and engage the center hole for playing. Some CD players that utilize a tray have a smaller diameter recessed area in the tray that will hold and play a reduced size (such as, for example, 3.25 inches in diameter) CD. However, those players with a recessed area for smaller diameter CD's will only work safely when the player positions the CD in a right side up and horizontal orientation. If the player is moved so as to place the CD in a vertical orientation or a horizontal upside down orientation, the CD may not be held in a position to allow for proper playback. This could result in distortion of the playback or damage to the CD and/or the CD player. For the 4.75 inch CD player that uses an insertion slot, there is no way to safely play a 3.25 inch CD.

Another solution to the different sized diameter CD's is the use of a center gripping type spindle such as is found in the CD player for an IBM Thinkpad 760EL. In this type of player, the CD is pressed onto the center gripping spindle which is fixed in a raised position. Therefore, regardless of the CD's diameter and the orientation of the player, the CD can be played safely.

Many games are now being placed on CD's for playing on a computer. It is popular to place a CD in a book describing the game. The book must be sized to accommodate the dimensions of the CD. It is possible to print nearly twice as many books for 3.25 inch CD's for the same price as printing larger books for 4.75 inch CD's. Unfortunately, due to the large number of 4.75 inch only players, it is necessary to use larger books to protect the larger (4.75 inch) CD's. While cost savings would be approximately equal by placing the 4.75 inch CD's into smaller books, the potential for damage to the CD's is too great. Another alternative is to place the smaller (3.25 inch) CD's into the smaller books and allow the purchaser to request an adapter through the mail. This alternative adds to the game manufacturer's cost and most assuredly reduces the satisfaction of the customer due to a waiting period for the adapter to arrive.

Since there are a plurality of various types of CD players and CD sizes, there is a need for a method and system for a shipping and playing adapter to enable a reduced size CD to play in a full-sized CD player.

SUMMARY OF THE INVENTION

The present invention disclosed and claimed herein comprises a method and apparatus for adapting a reduced size CD for shipping and for playing on a full-sized CD player which substantially eliminates the problems associated with the prior art. The present invention allows cost saving by allowing smaller CD's to be shipped to a customer and still be playable in any full-sized CD player.

In accordance with one aspect of the present invention, a shipping and playing adapter enables a reduced size CD to play in a full-sized CD player. The adapter comprises first and second substantially semi-circular portions constructed of a material suitable for playing in a CD player. When combined together, the first and second portions form a disk dimensioned approximately equal to a full-sized CD. The first and second portions may either be permanently attached along a fold line or removably attached by matching male and female parts. When combined, the first and second portions may have an inner circular surface for receiving the reduced size CD. The circular surface may be coated with a permanent or temporary adhesive. Alternatively, the first and second portions may have a center cut-out for receiving the reduced size CD therein.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1A:
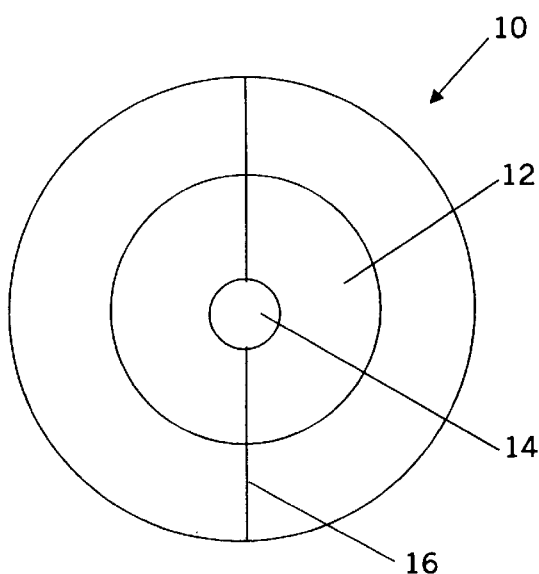
FIG. 1A is an opened adapter in accordance with one embodiment of the present invention.

Referring to FIG. 1A, there is depicted a plan view of a shipping and playing adapter 10 constructed in accordance with one embodiment of the present invention. The adapter 10 is constructed of a material that allows for radial strength sufficient to support a CD yet flexible enough to bend for shipping. One such material could be, for example, a plastic of category type HDPE #2. The adapter 10 has a diameter equal to that of a full-sized CD (typically 4.75 inches) and an inner circular surface 12 having a diameter equal to that of a reduced size CD (typically 3.25 inches). A center hole 14 is provided for engagement by a CD player spindle. A fold line 16 is cut or otherwise formed into the adapter 10 to allow for folding in half therealong.

Figure 2:
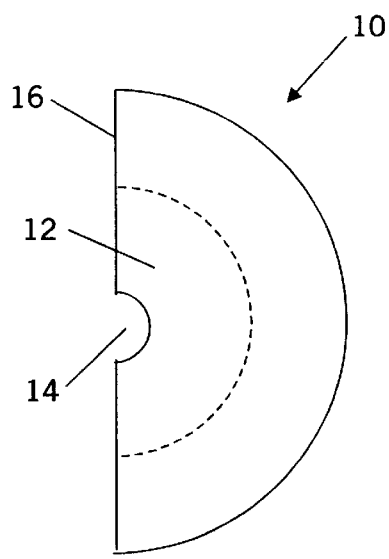
FIG. 2 is a plan view of the adapter of FIGS. 1A and 1B in a fully folded orientation.
Figure 1B:
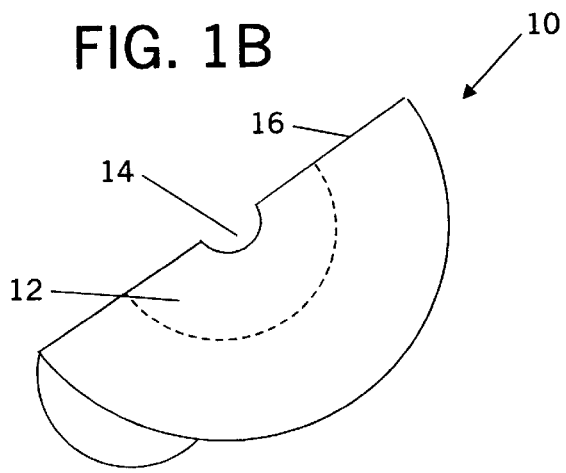
FIG. 1B is a perspective view of a partially folded shipping and playing adapter in accordance with the embodiment of FIG. 1A.

The inner circular surface 12 is coated with an adhesive for engaging and holding the reduced diameter CD. The adhesive may be moisture activated, covered with removable film, or any other suitable method to allow for attachment of the CD by the end user after shipping. In addition, the adhesive may be of a permanent type or allow for repeated removal and reattachment of the CD. The CD is placed onto the adhesive on the inner circular surface 12 with a playing/reading surface facing outward. The adapter 10 and attached CD would then be inserted into the CD player as any normal full-sized CD for playing. Referring to FIG. 1B, the adapter 10 is shown in a partially folded configuration in preparation for shipping or storing. The adapter 10 is folded in half along the fold line 16 into a shipping configuration (see FIG. 2).

Figure 3:
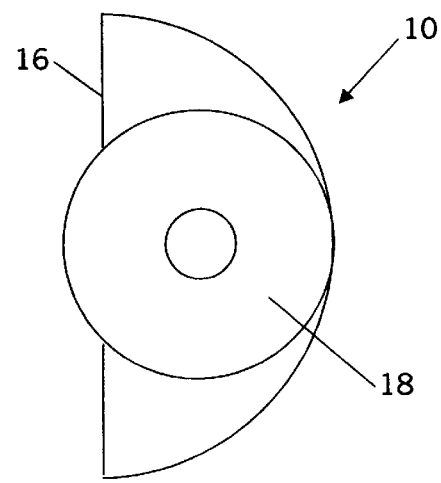
FIG. 3 is an illustration of the shipping and playing adapter in accordance with the present invention in a shipping configuration.

Referring now to FIG. 3, a reduced size CD 18 has been positioned on the adapter 10 in the shipping configuration. In this shipping configuration, the CD 18 and adapter 10 may be shrink wrapped or otherwise secured together for insertion into and mailing with an instruction booklet (not shown). As previously stated above, the CD 18 has a diameter approximately equal to that of the inner circular surface 12 on the adapter 10. Due to the reduction in overall size of the adapter 10 from its being folded in half, the CD 18 and adapter 10 may be safely shipped/sold in a smaller dimensioned booklet without risking damage to the CD 18 or the adapter 10.

Figure 4A:
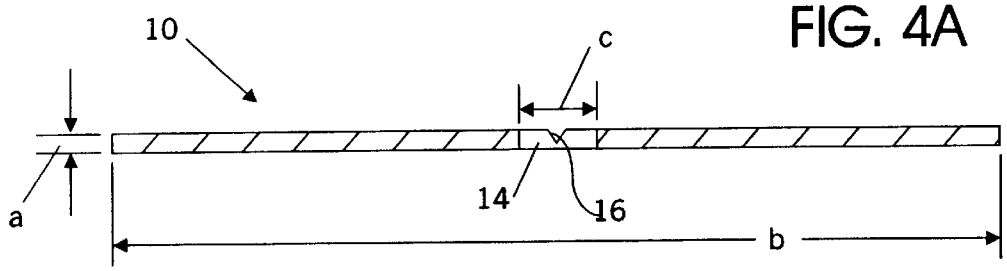
FIGS. 4A and 4B are cross-sectional views of the embodiment of FIG. 1A.
Figure 4B:
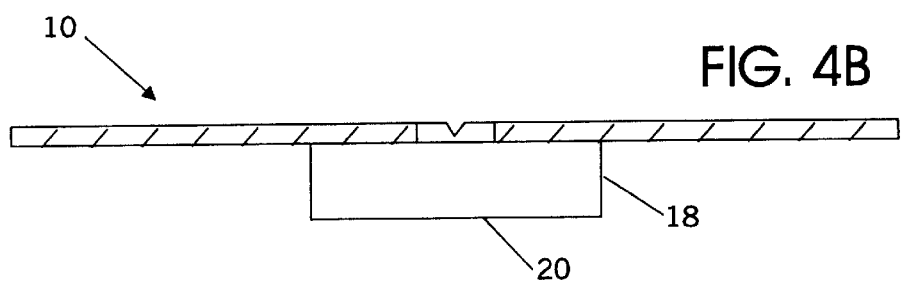

FIGS. 4A and 4B illustrate cross-sectional views of the adapter 10 in accordance with the embodiment of FIG. 1A. Referring first to FIG. 4A, the adapter 10 is shown in cross-section in a fully opened for playing configuration. The adapter 10 has a diameter "b" approximately equal to that of a full-sized CD such as, for example, 4.75 inches. The adapter 10 has a thickness "a" that may vary depending upon the type of material from which it is made, and/or the thickness of the CD to be attached thereto, and/or the amount of space available within the CD player. The center hole 14 has a diameter "c" which is dimensioned to fit properly on a CD player spindle. The fold line 16 is formed along a diameter of the adapter 10 such that the adapter 10 may be folded in half therealong.

As shown in FIG. 4B, the CD 18 is attached to the adapter 10 such that the fold line 16 remains exposed. The CD 18 is attached with a read/write side 20 facing away from the adapter 10. Although not shown, it is to be understood that the CD 18 may be attached to the same side of the adapter 10 as the fold line 16. Since CD's typically have a label on the side opposite the read/write side that includes such things as the product name, loading instructions, ownership rights, advertising, etc., it may be desirable to provide the same information on the adapter 10 so that an end user may still see such information once the CD is attached.

Figure 5A:
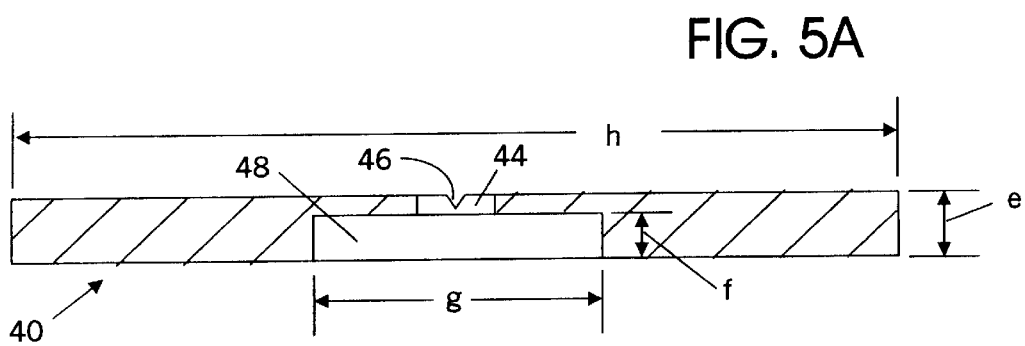
FIGS. 5A and 5B are cross-sectional views of an alternative embodiment of the present invention.
Figure 5B:
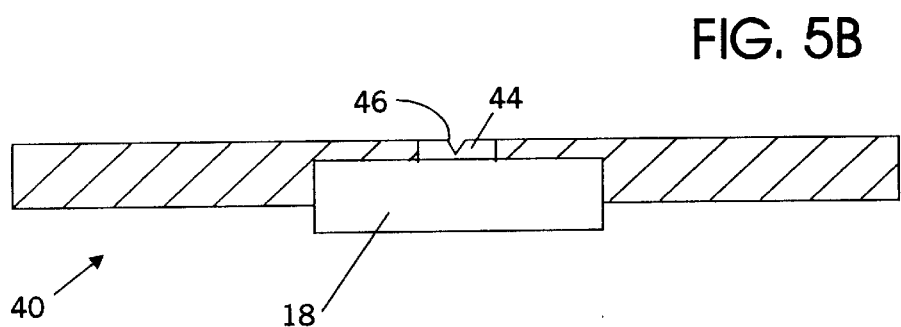

Referring to FIGS. 5A and 5B, a cross-sectional view of an alternative embodiment of an adapter 40 is shown. Similar to the adapter 10, the adapter 40 has a diameter "h" that is approximately equal to that of a full-sized CD (4.75 inches). In addition, the adapter 40 has a center hole 44 and a fold line 46 similar to those described for the adapter 10. In contrast to the adapter 10, the adapter 40 has a thickness "e" sufficient to accommodate a center cut-out 48. The cut-out 48 has a diameter "g" approximately equal to the diameter of a reduced size CD (3.25 inches), and a depth "f" that allows the CD 18 to be held therein (see FIG. 4B). The CD 18 may be held within the cut-out 48 by any appropriate method such as, for example, interference fitted, adhesive, etc. Of course, as with the adapter 10, the adapter 40 when combined with the CD 18 must have a thickness no greater than what may be inserted into a CD player.

Figure 6:
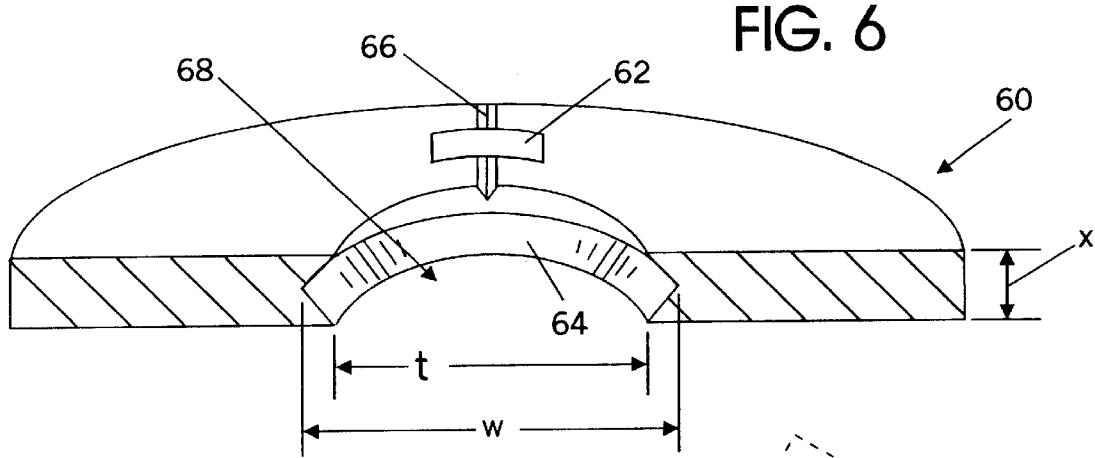
FIG. 6 is a cut-away perspective view of a further alternative embodiment of the present invention.
Figure 7:
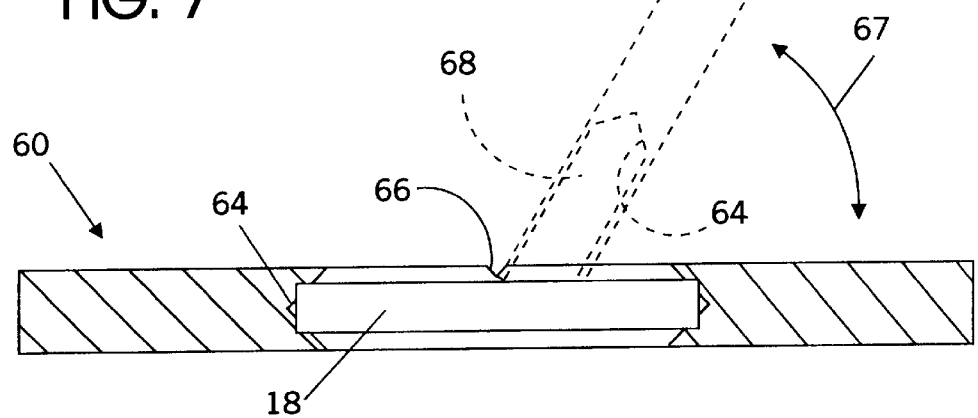
FIG. 7 is a cross-sectional view of the embodiment of FIG. 6 with a reduced diameter CD being inserted therein.

Referring to FIGS. 6 and 7, a further alternative embodiment of the present invention is shown. An adapter 60 is constructed with essentially the same diameter as the previous embodiments and a fold line 66. In contrast to the previous embodiments, the adapter 60 has a center cut-out 68 that is approximately the same size as a reduced size CD. The adapter 60 has a thickness "x" that is slightly greater than the thickness of the reduced size CD. The cut-out 68 has a first diameter "w" approximately equal to the diameter of a reduced size CD and a second diameter "t" smaller than the first diameter "w". The adapter 60 may be provided with an attachable adhesive strip 62 of varying dimensions for placement across the fold line 66 to provide additional rigidity to the adapter 60 in the playing configuration.

The adapter 60 is shown in FIG. 7 with a reduced size CD 18 being inserted therein for playing. Preferably, the adapter 60 is constructed of a material that is sufficiently pliable to allow for any needed deformation of a circumferential wall 64 upon insertion of the CD 18. If the CD 18 has a vertical edge, this deformation is necessary to interference fit the CD 18 with the adapter 60. The CD 18 is first positioned into one half of the adapter 60 as shown in FIG. 7 (phantom lines). Then the opposite half of the adapter 60 is folded down along arrow 67 and snapped into place around the rest of the CD 18 (solid lines). Thus, the adapter 60 and the CD 18, once connected together, are configured to be approximately the same size as a full-sized CD. Although not shown, it is to be understood that there may be various configurations for the circumferential wall of the adapter 60 and that the thickness "x" can be less than or equal to the thickness of the reduced diameter CD.

Figure 8:
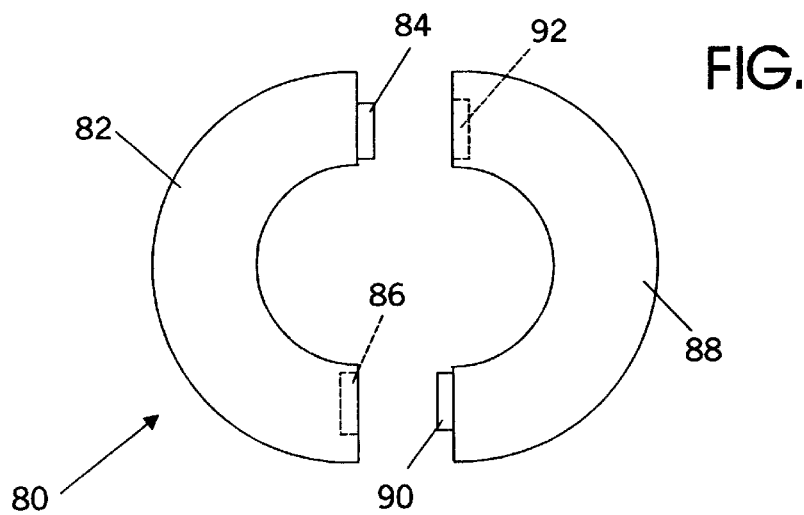
FIG. 8 is a still further alternative embodiment of the present invention.

Referring to FIG. 8, a still further alternative embodiment of the present invention is shown. Rather than a fold line for folding in half, an adapter 80 is provided in two separate halves. The adapter 80 is essentially the same as that shown in FIGS. 6 and 7 except that press fitting of the two halves around a CD is required. A first half 82 has a male portion 84 and a female portion 86. A second half 88 has a male portion 90 and a female portion 92. When connecting the two halves 82 and 88 together around a CD, the male portion 84 is mated with the female portion 92 and the male portion 90 is mated with the female portion 86. Although not shown, it is to be understood that numerous other alternatives to the male portions 84 and 90 and the female portions 86 and 92 may be provided and still fall within the scope of the present invention, for example, removable dowel type pins. In addition, the embodiment of FIG. 8 may be configured with an inner circular surface for receiving the reduced size CD similar to the embodiment of FIG. 1A rather than the center cut-out similar to the embodiment of FIG. 6.

Thus the present invention provides a shipping and playing adapter that allows a reduced size CD to be played in any full-sized CD player. The adapter as taught herein affords a CD game manufacturer a cost savings by allowing smaller books to be printed to ship and sell their game in while still protecting the CD from damage and allowing playability in any CD player.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A shipping and playing adapter to enable a reduced size CD to play in a full-sized CD player and to allow the reduced size CD and the adapter to be shipped together in a configuration smaller than a full-sized CD, the adapter comprising:

a substantially semi-circular first portion constructed of a material which is suitable for insertion into a CD player;

a substantially semi-circular second portion constructed of said suitable material, said first and second portions together being dimensioned approximately equal to a full-sized CD;

said first and second portion combining to form a disk for receiving the reduced size CD and for playing the reduced size CD in the full-sized CD player; and means for configuring said first and second portion for shipping with said reduced size CD, said means for configuring said first and second portion for shipping comprising means for folding said first and second portion along an interconnecting fold line therebetween, wherein said first and second portion and said reduced size CD thus configured are sized smaller than said full-sized CD.

2. The adapter of claim 1, further comprising an inner circular surface on said first and second portions dimensioned for receiving the reduced size CD.

3. The adapter of claim 2, wherein said inner circular surface has an adhesive coating thereon for removably attaching the reduced size CD.

4. The adapter of claim 2, wherein said inner circular surface has an adhesive coating thereon for permanently attaching the reduced size CD.

5. The adapter of claim 1, wherein said first and second portion have a cut-out dimensioned for receiving the reduced size CD therein.

6. The adapter of claim 1, wherein said means for folding further comprises means for detachably interconnecting said first and second portion along said interconnecting fold line therebetween by at least one set of connectors.

* * * * *